H. T. HERR.
COMPRESSOR CONTROLLING MEANS.
APPLICATION FILED DEC. 24, 1914.
1,291,875.
Patented Jan. 21, 1919.
2 SHEETS—SHEET 2.
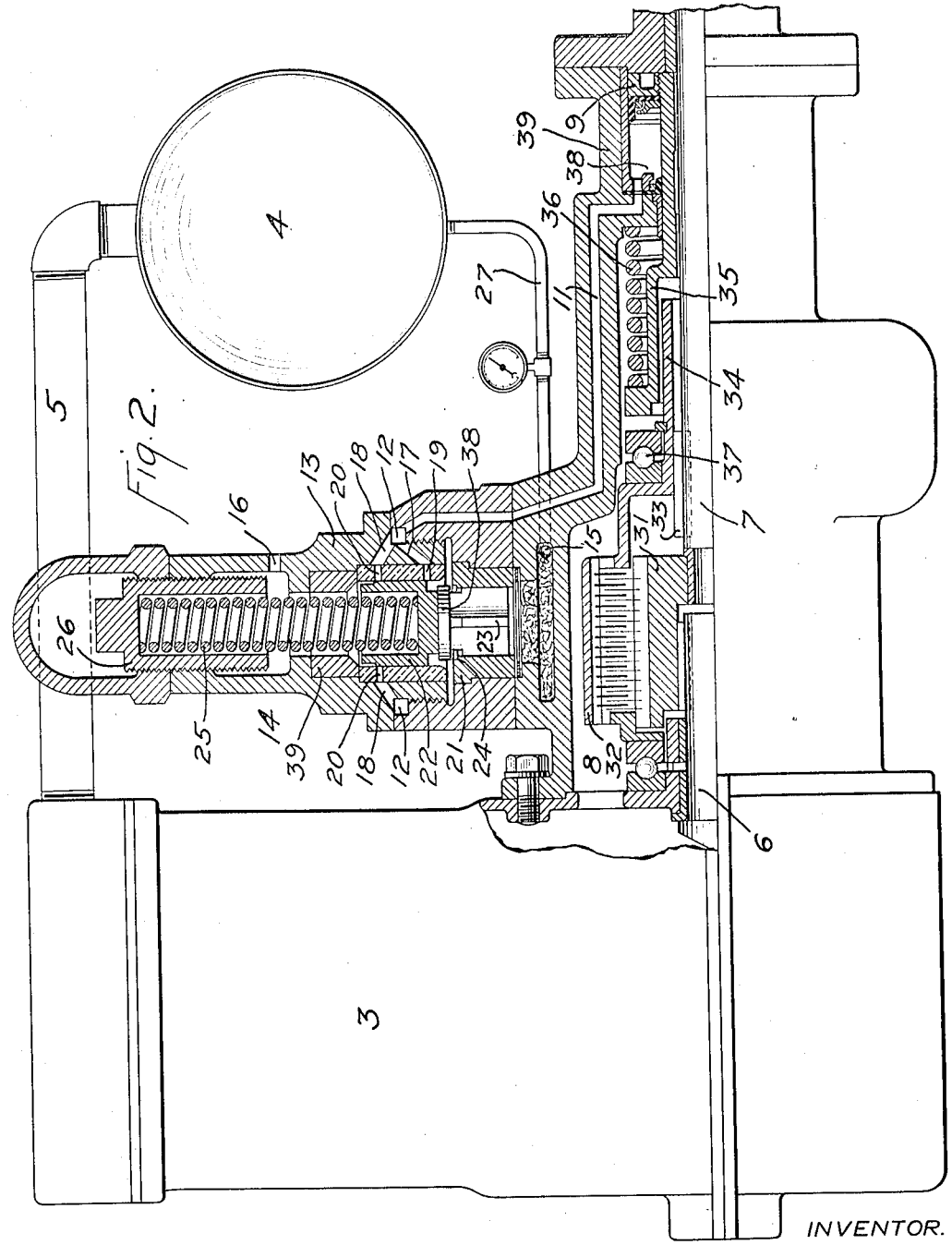
INVENTOR.
Herbert T. Herr
BY
HIS ATTORNEY IN FACT

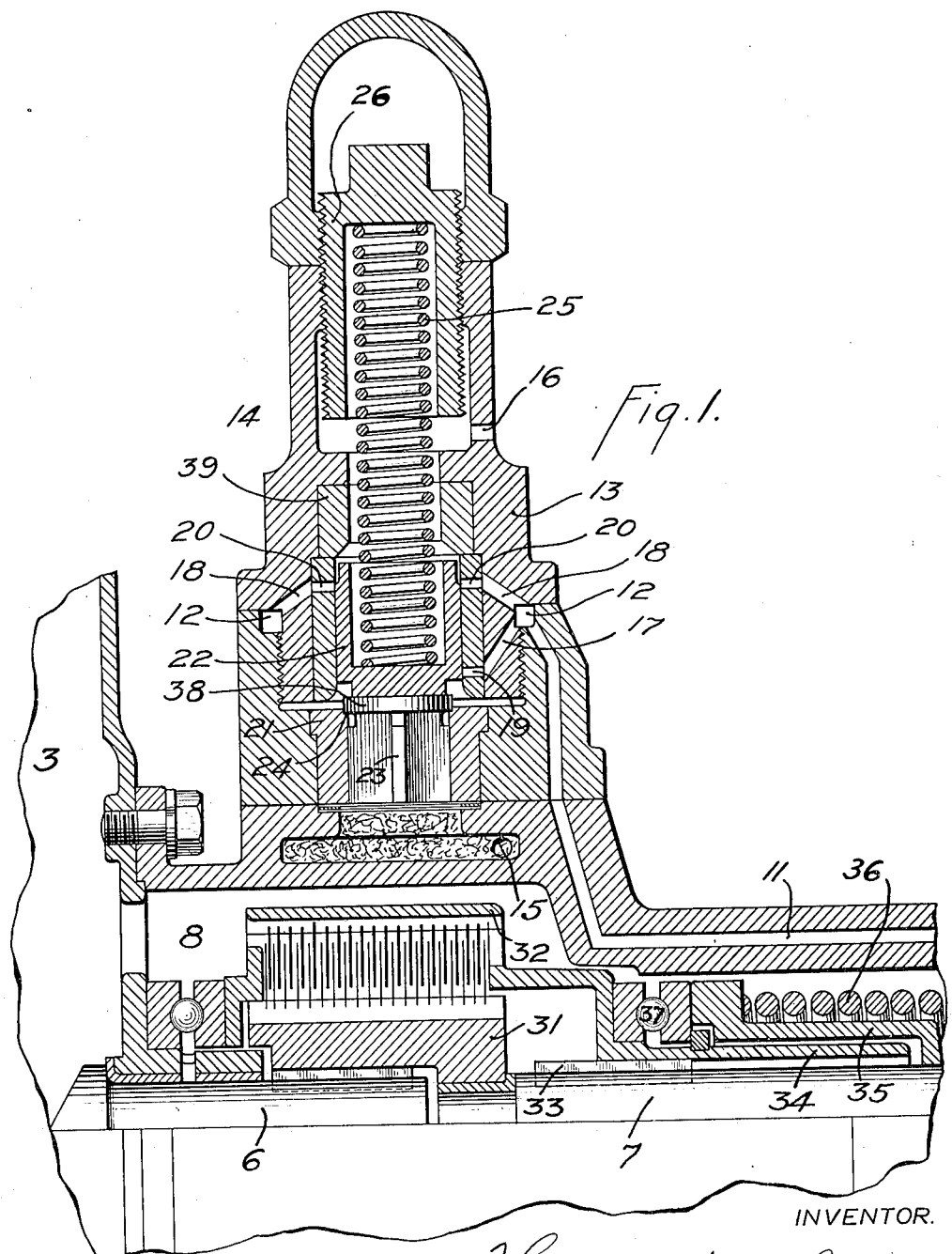

UNITED STATES PATENT OFFICE.

HERBERT T. HERR, OF PITTSBURGH, PENNSYLVANIA.

COMPRESSOR-CONTROLLING MEANS.

1,291,875.  Specification of Letters Patent.  Patented Jan. 21, 1919.

Application filed December 24, 1914. Serial No. 878,928.

*To all whom it may concern:*

Be it known that I, HERBERT T. HERR, a citizen of the United States, and a resident of Pittsburgh, in the county of Allegheny and State of Pennsylvania, have made a new and useful Invention in Compressor-Controlling Means, of which the following is a specification.

This invention relates to means for automatically controlling the operation of pressure developing apparatus, such for example as air compressors and similar machines, and has for an object to produce a simple, cheap and effective controlling mechanism, which operates in response to the pressure delivered by the apparatus to be controlled.

A further object is to produce a pressure responsive controlling mechanism for pressure developing apparatus, which may be readily adjusted for the purpose of varying the degree of pressure developed by the apparatus.

These and other objects are attained by means of a mechanism embodying the features of the apparatus illustrated in the accompanying drawings.

In the drawings forming a part hereof, Figure 1 is a fragmental sectional view of a governing mechanism, embodying my invention, and illustrates the positions occupied by the parts during the normal operation of the governed apparatus.

Fig. 2 is a partial sectional view of the mechanism illustrated in Fig. 1, shown in connection with a diagrammatic side elevation of the apparatus to be governed, and illustrating the positions occupied by the parts when the pressure developed by the governed apparatus exceeds the normal or a determined fixed pressure.

In the drawings I have illustrated an embodiment of the invention in which a compressor, or other pressure developing apparatus, is adapted to be driven by a constantly rotating shaft, such for example, as the shaft of an internal combustion engine, which as is well known, can not operate efficiently under varying speeds. The apparatus also includes a clutch mechanism, between the driving shaft and the apparatus to be governed, which is controlled in its operation by a controller or regulator responsive to the pressure developed by the apparatus to be governed, and which therefore operatively connects or disconnects the driving shaft and the apparatus in response to variations in the pressure developed by the apparatus.

It will be clearly apparent to those skilled in the art that while my invention contemplates the arrangement of apparatus illustrated, it is not limited in its application to the control of a clutch mechanism and it may also be employed in controlling the delivery of motive fluid to the driving mechanism of the governed apparatus, or it may be employed in controlling the effective area of the intake port or ports of the pressure developing apparatus.

Referring now to the drawings: The apparatus illustrated includes a compressor or other similar apparatus 3, which is adapted to deliver fluid under pressure to a receiving tank 4, through a pipe 5. The shaft 6 of the compressor is adapted to be operatively connected to a driving shaft 7, by means of a clutch mechanism generally indicated by the numeral 8, and which will hereinafter be described. The clutch mechanism is operated by a pressure actuated piston 9, which surrounds the shaft 7 and is adapted to receive actuating pressure through a passage 11. The passage 11 communicates with an annular chamber 12 formed in the casing 13 of a pressure responsive valve mechanism, generally indicated by the numeral 14.

The casing of the valve mechanism 14 is provided with an inlet port 15, a discharge port 16, which communicates with the atmosphere, and branch passages 17 and 18 which communicate with the chamber 12 and which respectively communicate with the ports 19 and 20, formed in a cylindrical bushing which is located within the casing 13. A plunger or piston 22 is located within the casing and is surrounded by the bushing. As illustrated, the plunger is provided with guide wings 23, and is adapted to seat on a valve seat 24, provided on the bushing 21. A coiled spring 25 is shown for yieldingly holding the piston on its seat and, as illustrated, operates between the piston and an adjustable spring block 26, which is formed in the shape of a screw block and is screwed into the end of the casing 13.

As illustrated, the inlet port 15 is located in the casing 13, below the valve seat 24, and the lower face of the piston is always exposed to the pressure delivered through the port 15. Consequently the piston 22 is adapted to move, in opposition to the pressure exerted by the spring 25, and in response to the fluid pressure delivered through the port 15, which as illustrated, communicates with the receiver 4, through a pipe or passage 27. The ports 19 and 20 are located above the valve seat and the piston is so located and so proportioned, with reference to these ports, that it closes the port 20 as it lifts from its seat and starts to open the port 19 and, vice versa, closes the port 19 as it moves toward its seat and starts to open the port 20. In the normal position of the piston, that is, when the piston is seated, the port 19 is closed while the port 20 is open and in communication with the atmosphere through the discharge port 16. For this reason I termed the passage 18 the discharge passage, since its function is to discharge fluid from the passage 11.

As the piston lifts from its seat and closes the port 20, the port 19 is placed in communication with the inlet port 15, and therefore fluid under pressure from the receiver 4 is delivered through the passage 17 to the chamber 12, and consequently to the passage 11.

The operating face of the piston is shown formed in two diameters with the portion of smaller diameter capable of engaging the seat 24. With such a construction the piston 22 operates as a differential piston and provides an annular chamber around the piston and immediately adjacent to the seat 24, which is not exposed to the pressure delivered through the inlet port 15 when the piston is seated. As soon as the piston is unseated, however, its entire face is exposed to the operating fluid pressure and, because of the increased area exposed to the fluid pressure, it will move to immediately open the port 19 and close the port 20.

As illustrated, the clutch mechanism 8 consists of two series of interleaving disks, one of which is mounted on a sleeve 31, splined to the shaft 6, and the other of which is mounted on the inner face of a cylinder 32, which is operatively secured to the driving shaft 7 by means of a feather or key connection 33. The cylinder 32, as illustrated, is integrally formed with a sleeve 34, which surrounds the driving shaft 7 and which, by reason of the key connection 33, is movable longitudinally of the shaft, but is caused to rotate with it. Surrounding the sleeve 34 and loosely mounted on the shaft 7 is a sleeve 35, which is normally pressed toward the clutch mechanism 8, by means of an actuating spring 36, and is adapted to press the interleaving disks of the clutch mechanism in engagement with each other through the agency of a thrust bearing 37, which is located between it and a shoulder formed on the sleeve 34.

As illustrated, the piston 9 is formed on the end of the sleeve 35, and is located within an annular chamber 38, formed between the sleeve 35 and a casing 39 inclosing the clutch mechanism. The passage 11 communicates with the chamber 38, and the piston 9 is so located within the chamber that it relieves the thrust bearing 37 of the pressure of spring 36 when fluid under pressure is delivered to the chamber 38 through the passage 11, and consequently it operates to render the clutch mechanism ineffective in coupling the shafts 6 and 7.

The operation of the apparatus is as follows: When the pressure developed by the apparatus 3 exceeds a predetermined pressure, the piston 22 lifts from its seat and admits fluid under pressure from the port 15 to its entire face. This increase in the amount of fluid pressure on the piston, causes it to immediately move away from its seat and to simultaneously close the port 20 and open the port 19. This delivers the fluid pressure to the chamber 38 and causes the piston 9 to move in opposition to the pressure of the spring 36 and to disconnect the shafts 6 and 7 by rendering the clutch inoperative. The compressor 3 will therefore stop. When the pressure in the receiver 4 is reduced to normal or to a determined pressure, the piston 22 moving, in response to the pressure of the spring 25, opens the port 20 and closes the port 19, thereby exhausting the chamber 38 and permitting the spring 36 to shift the sleeve 35 and consequently the sleeve 34, so as to render the clutch mechanism effective in connecting the shafts 6 and 7. This starts the compressor and it will continue to operate until the pressure in the receiver again exceeds the determined or normal pressure.

While I have described the wing 23 as secured to or forming a part of the piston 22, it will be apparent that it and the circular disk 38, shown as forming the seat engaging portion of the piston 22, may be formed separately of the piston, and that while this construction will to some extent simplify the manufacture of the valve it will not affect its operation. I have also shown a hardened bushing located within the valve casing immediately above the piston 22, which is provided with a chamfered seat for the upper edge of the piston 22 which is also hardened. With this arrangement an absolutely air tight joint is insured when the piston 22 is located in the upper extreme position.

While I have described what I now consider to be the preferred embodiment of my invention, it will be apparent that various changes, modifications, substitutions and omissions may be made in the apparatus illustrated without departing from the spirit and scope of my invention.

What I claim is:

1. In combination with a compressor, a driven shaft forming a part of the compressor, a driving shaft, a two-part clutch for operatively connecting said shafts, a piston axially alined with said clutch for controlling the same, means for normally holding the piston in the position which renders the clutch operative, and a mechanism for delivering fluid under pressure to the piston for holding it in the position which renders the clutch inoperative in response to pressure pumped by the compressor, said mechanism including a valve casing having a fluid delivery port communicating with the piston, a passage formed within said casing communicating with said port and adapted to be placed in communication with the atmosphere, a second passage formed within said casing communicating with said port and adapted to deliver pressure pumped by said compressor to said port, and a plunger exposed on one side to the pressure of the fluid pumped by said compressor for controlling said passages.

2. In combination with a compressor, a shaft for driving said compressor, a multiple disk clutch between said shaft and said compressor, a fluid actuated piston adjacent to the clutch and axially alined with the shaft for controlling the same, a spring surrounding the shaft for normally holding the piston against the clutch to thereby hold the disks of the clutch in engagement, a valve for delivering actuating fluid to the piston when a predetermined pressure has been reached for holding the piston away from the clutch and to thereby stop the compressor, means for accelerating the opening of said valve, means for relieving the pressure on the piston for normal operation, and a spring for normally holding the valve shut against the pressure generated by the compressor.

3. In combination with a compressor, a driven shaft for transmitting power to the compressor, a driving member, a two-part clutch for operatively connecting said member to said driven shaft, a piston axially alined with the parts of said clutch and surrounding said member, a sleeve surrounding said member and carried by said piston and adapted to engage one of the parts of said clutch, a spring for forcing said sleeve into engagement with one of the parts of said clutch and for forcing said parts into clutching engagement, and a pressure controlled valve for delivering actuating fluid pressure to said piston to actuate said piston to move said sleeve out of engagement with said clutch in opposition to the pressure of said spring.

In testimony whereof, I have hereunto subscribed my name this 23rd day of December, 1914.

HERBERT T. HERR.

Witnesses:
C. W. McGHEE,
E. W. McCALLISTER.